(12) United States Patent
Yamada et al.

(10) Patent No.: US 7,889,270 B2
(45) Date of Patent: Feb. 15, 2011

(54) IMAGE PICKUP APPARATUS AND DISPLAY CONTROL METHOD

(75) Inventors: Tokuichiro Yamada, Kanagawa (JP); Tsutomu Kume, Ibaraki (JP)

(73) Assignee: Sony Corporation (JP)

( * ) Notice: Subject to any disclaimer, the term of this patent is extended or adjusted under 35 U.S.C. 154(b) by 954 days.

(21) Appl. No.: 11/509,149

(22) Filed: Aug. 24, 2006

(65) Prior Publication Data

US 2007/0052836 A1 Mar. 8, 2007

(30) Foreign Application Priority Data

Aug. 25, 2005 (JP) .......................... P2005-243585

(51) Int. Cl.
H04N 5/232 (2006.01)
H04N 5/222 (2006.01)

(52) U.S. Cl. ............. 348/346; 348/333.01; 348/333.02; 348/345; 348/349

(58) Field of Classification Search ............ 348/207.99, 348/208.12, 208.15, 220.1, 221.1, 228.1, 348/230.1, 234, 235, 252, 289, 294, 297, 348/333.01, 333.02, 333.03, 333.04, 333.11, 348/333.12, 345, 346, 348, 349, 353, 354, 348/355, 356; 396/79, 80, 82, 87, 88, 89, 396/95, 104, 121, 123, 124, 130, 131, 137, 396/147, 281, 287; 363/79, 80, 82, 87, 88, 363/89, 95, 104, 121, 123, 124, 130, 131, 363/137, 147, 281, 287
See application file for complete search history.

(56) References Cited

U.S. PATENT DOCUMENTS 5,496,106 A * 3/1996 Anderson ................... 348/255
5,913,081 A * 6/1999 Okano et al. ................... 396/55
7,030,894 B2 * 4/2006 Allen et al. ................. 345/698

FOREIGN PATENT DOCUMENTS

| JP | 6-113183 | 4/1994 |
|---|---|---|
| JP | 6-113184 | 4/1994 |
| JP | 7-281086 A | 10/1995 |
| JP | 9-018770 A | 1/1997 |
| JP | 2001-008085 | 1/2001 |
| JP | 2002-196225 A | 7/2002 |
| JP | 2004-117775 A | 4/2004 |
| JP | 2004-187124 A | 7/2004 |
| JP | 2004-309915 | 11/2004 |

* cited by examiner

Primary Examiner—David L Ometz
Assistant Examiner—Peter Chon
(74) Attorney, Agent, or Firm—Lerner, David, Littenberg, Krumholz & Mentlik, LLP

(57) ABSTRACT

An image pickup apparatus using a solid image pickup device includes a manual focus adjusting unit configured to control the position of a focus lens in response to a user's input operation; an edge detecting unit configured to detect edge components of each pixel from an image signal obtained by image pickup and to output detection levels of the detected edge components; a color signal replacement unit configured to replace a signal of a pixel corresponding to the detection level or signals of pixels in a predetermined range containing the corresponding pixel on the image signal with a predetermined color signal when the detection level is equal to or higher than a predetermined value; and a display unit configured to display an image based on an output image signal from the color signal replacement unit.

12 Claims, 7 Drawing Sheets

IMAGE PICKUP APPARATUS AND DISPLAY CONTROL METHOD

CROSS-REFERENCE TO RELATED APPLICATIONS

The present application claims priority from Japanese Patent Application No. JP 2005-243585 filed on Aug. 25, 2005, the disclosure of which is hereby incorporated by reference herein.

BACKGROUND OF THE INVENTION

1. Field of the Invention

The present invention relates to an image pickup apparatus for capturing an image by using a solid image pickup device and a method of controlling the display of the same. More specifically, the present invention relates to an image pickup apparatus having a manual focusing function and a method of controlling the display of the same.

2. Description of the Related Art

Known image pickup apparatuses using a solid image pickup device, such as a digital still camera and a digital video camera, generally have an auto focusing (AF) function of automatically bring an image into focus. However, in recent years, many image pickup apparatuses have a manual focusing function of manually bring an image into focus. In such an image pickup apparatus, usually, a picked up image is displayed on a monitor (or an electronic viewfinder), such as an LCD (liquid crystal display), provided at the rear surface thereof. A user confirms the focus adjusted state by viewing the monitor.

In the image pickup apparatuses with an auto focusing function according to the related art, some images, as the result of the focus adjustment, are displayed on a monitor such that a user can recognize when focusing has occurred. For example, some image pickup apparatuses have a function of displaying a lock mark when focusing is completed or a function of highlighting an area brought into focus among divided areas of an image. Also, some image pickup apparatuses apply a color that is different from the color of the subject to the edge of a subject brought into focus (for example, JP-A-2001-8085 (paragraph [0019] and FIG. 4).

Meanwhile, some of the image pickup apparatuses with a manual focusing function according to the related art display edge detection information on a monitor as a bar graph, and some highlight an area brought into focus among divided areas on a monitor. Further, some image pickup apparatuses change the color of each of the divided areas according to the focused state based on edge detection information (for example, JP-A-6-113183 (paragraphs [0022] to [0039] and FIG. 2).

However, in a technique for showing a focused state for every divided area at the time of adjusting focus by manual operation, when a plurality of subjects exist in the same area, a user cannot differentiate which subject is focused. For this reason, it is necessary to change composition so as to reset an area or focus on a specific area.

Further, in order for precise focus adjustment, it is preferable that the user view the sharpness of the subject displayed on the monitor and discriminate the adjusted state. However, most monitors provided on the rear surfaces of image pickup apparatuses do not have such a resolution and size that the user can precisely confirm the sharpness of a subject due to the size or the manufacturing cost. For this reason, it is difficult to precisely adjust focus by manual operation by using a visual observation method.

Accordingly, it is desirable to provide an image pickup apparatus capable of precisely adjusting manual focus while viewing an image displayed on a monitor.

It is also desirable to provide a method of controlling the display of an image pickup apparatus capable of precisely adjusting manual focus while viewing an image displayed on a monitor.

SUMMARY OF THE INVENTION

According to an embodiment of the present invention, there is provided an image pickup apparatus using a solid image pickup device. The image pickup apparatus includes manual focus adjusting means for controlling the position of a focus lens in response to a user's input operation; edge detecting means for detecting edge components of each pixel from an image signal obtained by image pickup and for outputting detection levels of the detected edge components; color signal replacement means for replacing a signal of a pixel corresponding to the detection level or signals of pixels in a predetermined range containing the corresponding pixel on the image signal with a predetermined color signal when the detection level is equal to or higher than a predetermined value; and display means for displaying an image based on an output image signal from the color signal replacement means.

In the image pickup apparatus, the color signal replacement means replaces, of image signals obtained by image pickup, the signal of a pixel whose detection level of an edge component detected by the edge detecting means is equal to or higher than the predetermined value or the signals of pixels in a predetermined range containing the corresponding pixel on the image signal with a predetermined color signal. Therefore, in a picked up image displayed on the display means, an edge portion of a subject in which the degree of focusing is relatively high is displayed by a predetermined color.

For example, color signal replacement may be performed using different color signals according to the detection levels of edge components. In this case, in the picked up image displayed on the display means, the edge portion of the subject is displayed by different colors according to the focusing degree.

According to the image pickup apparatus of the invention, in a picked up image displayed on the display means, an edge portion of a subject on which a focusing degree is relatively high is displayed by a predetermined color. Therefore, a user manually taking focus can easily confirm the edge portion of the subject on which the focusing degree is relatively high with his or her eyes and thus more precisely adjust focus.

Further, when the color signal replacement is performed using different color signals according to the detection levels of edge components, in the picked up image displayed on the display means, the edge portion of the subject is displayed by different colors according to the focusing degree. Therefore, the user can easily confirm whether the subject is brought into focus, and thus further more precisely adjust the focus.

DETAILED DESCRIPTION

Hereinafter, embodiments of the invention will be described in detail with reference to the accompanying drawings.

Figure 1:
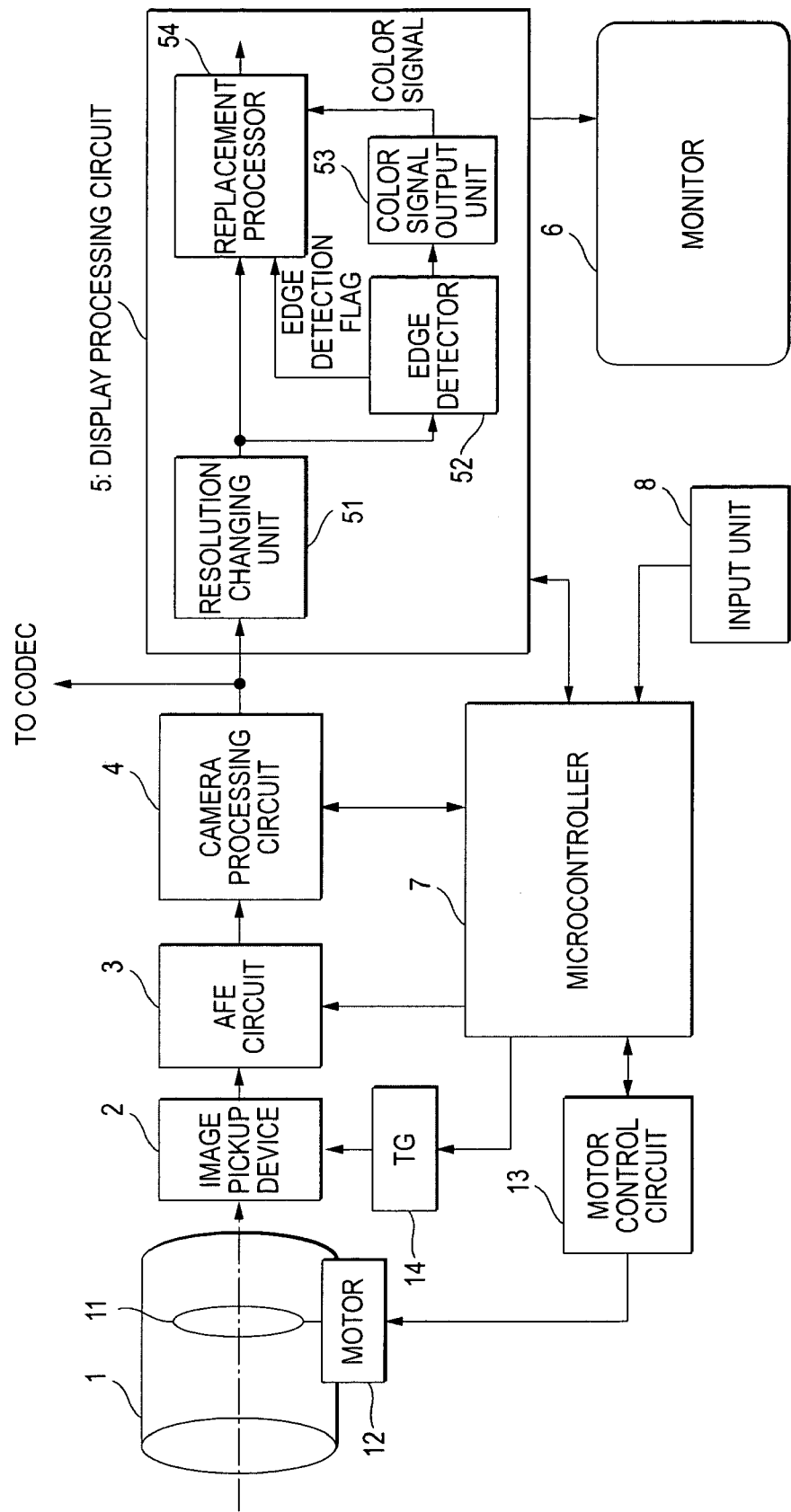
FIG. 1 is a block diagram illustrating the main configuration of an image pickup apparatus according to an embodiment of the invention.

FIG. 1 is a block diagram showing the main configuration of an image pickup apparatus according to an embodiment of the invention.

The image pickup apparatus shown in FIG. 1 includes an optical block 1, an image pickup device 2, an analog front end (AFE) circuit 3, a camera processing circuit 4, a display processing circuit 5, a monitor 6, a microcontroller 7, and an input unit 8. Further, the image pickup apparatus includes a motor 12 for driving a focus lens 11 of the optical block 1, a motor control circuit 13 for controlling the motor 12, and a timing generator (TG) 14 for driving the image pickup device 2.

The optical block 1 includes: a lens for focusing light from a subject on the image pickup device 2; a driving mechanism for moving the lens to focus the lens or zoom in the subject; a shutter mechanism; and an iris mechanism. In FIG. 1, specifically, the motor 12 is shown as the driving mechanism for the focus lens 11. The motor 12 operates in response to a driving control signal from the motor control circuit 13 to move the focus lens 11. The motor control circuit 13 controls the operation of the motor 12 in response to a control signal from the microcontroller 7.

The image pickup device 2 is a solid image pickup device, such as a charge-coupled device (CCD) or a complementary metal oxide semiconductor (CMOS). The image pickup device 2 is driven on the basis of a timing signal output from the TG 14, and converts incident light from the subject into an electric signal. The TG 14 outputs a timing signal under the control of the microcontroller 7.

The AFE circuit 3 performs a sample-and-hold operation on an image signal output from the image pickup device 2 by a CDS (Correlated Double Sampling) process to obtain a good S/N (Signal/Noise) ratio, controls the gain of the image signal by an AGC (Auto Gain Control) process, converts the image signal with the controlled gain into a digital image signal, and then outputs the digital image signal.

The camera processing circuit 4 performs various camera signal processes, such as AF (Auto Focus), AE (Auto Exposure), and white valance adjustment, or some of the various camera signal processes on the image signal from the AFE circuit 3.

The display processing circuit 5 generates an image signal to be displayed on the monitor 6 from the image signal supplied from the camera processing circuit 4, and supplies the generated image signal to the monitor 6 so as to display an image. In order for such functions, the display processing circuit 5 includes, as one of functional blocks, a resolution changing unit 51 for changing the resolution of the input image signal in accordance with the resolution of the monitor 6. Further, in this embodiment, the display processing circuit 5 includes an edge detector 52, a color signal output unit 53, and a replacement processor 54, as function blocks for changing the display color of an edge portion according to an edge detection result at the time of selecting a manual focusing mode. The edge detector 52, the color signal output unit 53, and the replacement processor 54 will be described below.

The monitor 6 is, for example, an LCD, and displays, for example, a camera still image during photographing or an image reproduced on the basis of data recorded in a recording medium (not shown). The monitor 6 is provided at, for example, the rear surface of the image pickup apparatus. The monitor 6 may be provided as an electronic viewfinder. Alternatively, both a rear monitor and an electronic viewfinder may be separately provided.

The microcontroller 7 includes, for example, a CPU (Central Processing Unit), a ROM (Read Only Memory), and a RAM (Random Access Memory). The microcontroller 7 executes programs stored in, for example, the ROM to totally control the individual units of the image pickup apparatus or to perform various operations for such control.

The input unit 8 includes operation keys used for a user's input operation, a dial, a lever, and outputs a control signal corresponding to the input operation to the microcontroller 7. The input unit 8 may be, for example, a known shutter release button. In particular, in this embodiment, the input unit 8 may be a switch, such as a focus ring or a focus button, for bringing into focus by a manual operation, or a switch for switching between an auto-focusing mode and a manual focusing mode and turning on/off a mode in which an edge is emphasized on the basis of the edge detection result (referred to as an edge emphasis mode).

In the image pickup apparatus, the image pickup device 2 receives light, converts the received light into an electric signal, and outputs the electric signal to the AFE circuit 3. The AFC circuit 3 performs the CDS process or the AGC process on the electric signal and converts the processed signal into a digital image signal. The camera processing circuit 4 performs an image-quality correcting process on the digital image signal supplied from the AFE circuit 3, converts the processed signal into a brightness signal and a color difference signal, and outputs the brightness signal and the color difference signal.

The image data output from the camera processing circuit 4 is supplied to the display processing circuit 5. The display processing circuit 5 converts the image data into a display image signal and displays a camera still image on the monitor 6 on the basis of the display image signal. Further, when the microcontroller 7 is instructed to record the camera still image by, for example, a user's input operation through the input unit 8, the image data from the camera processing circuit 4 is supplied to a CODEC (encoder-decoder) (not shown). The CODEC performs a predetermined compressing/encoding process on the image data and records the processed data in a recording medium (not shown). The camera processing circuit 4 supplies image data to the CODEC frame-by-frame when still images are recorded. When moving images are recorded, the camera processing circuit 4 continuously supplies the processed image data to the CODEC.

Next, the focusing operation of the image pickup apparatus will be described.

The image pickup apparatus has an auto-focusing mode and a manual focusing mode. In the auto-focusing mode, due to, for example, an AF detecting function of the camera processing circuit 4, a focus evaluation value representing contrast can be obtained by integrating high-frequency components of a predetermined region of the image. Then, the microcontroller 7 controls the position of the focus lens 11 such that the focus evaluation value is maximized, whereby the focus lens 11 automatically moves to a focused position.

Meanwhile, in the manual focusing mode, the focus lens 11 moves in response to the operation of the focus ring of the input unit 8. In the manual focusing mode, it is possible to select the edge emphasis mode on the monitor 6 for changing the color of an edge portion and displaying the edge with the changed color. When the edge emphasis mode is selected, the edge detector 52, the color signal output unit 53, and the replacement processor 54 of the display processing circuit 5 start to operate.

The edge detector 52 detects edge components of every pixel from the image signal output from the resolution changing unit 51. More specifically, the edge detector 52 calculates detected levels of the edge components (edge levels) by, for example, performing high-pass (band-pass) filtering on the image signal output from the resolution changing unit 51 for every pixel. When the edge level detected by the edge detector 52 is equal to or higher than a predetermined value, the color signal output unit 53 sets an edge detection flag for the replacement processor 54 to a high level and outputs a color signal corresponding to the edge level. When the edge detection flag supplied from the edge detector 52 is at the high level, the replacement processor 54 replaces the image signal from the resolution changing unit 51 with the color signal from the color signal output unit 53. In this way, the image signal for an edge having the edge level equal to or higher than the predetermined value is replaced with the color signal corresponding to the level and display according to the color signal is performed on the monitor 6.

Figure 2:
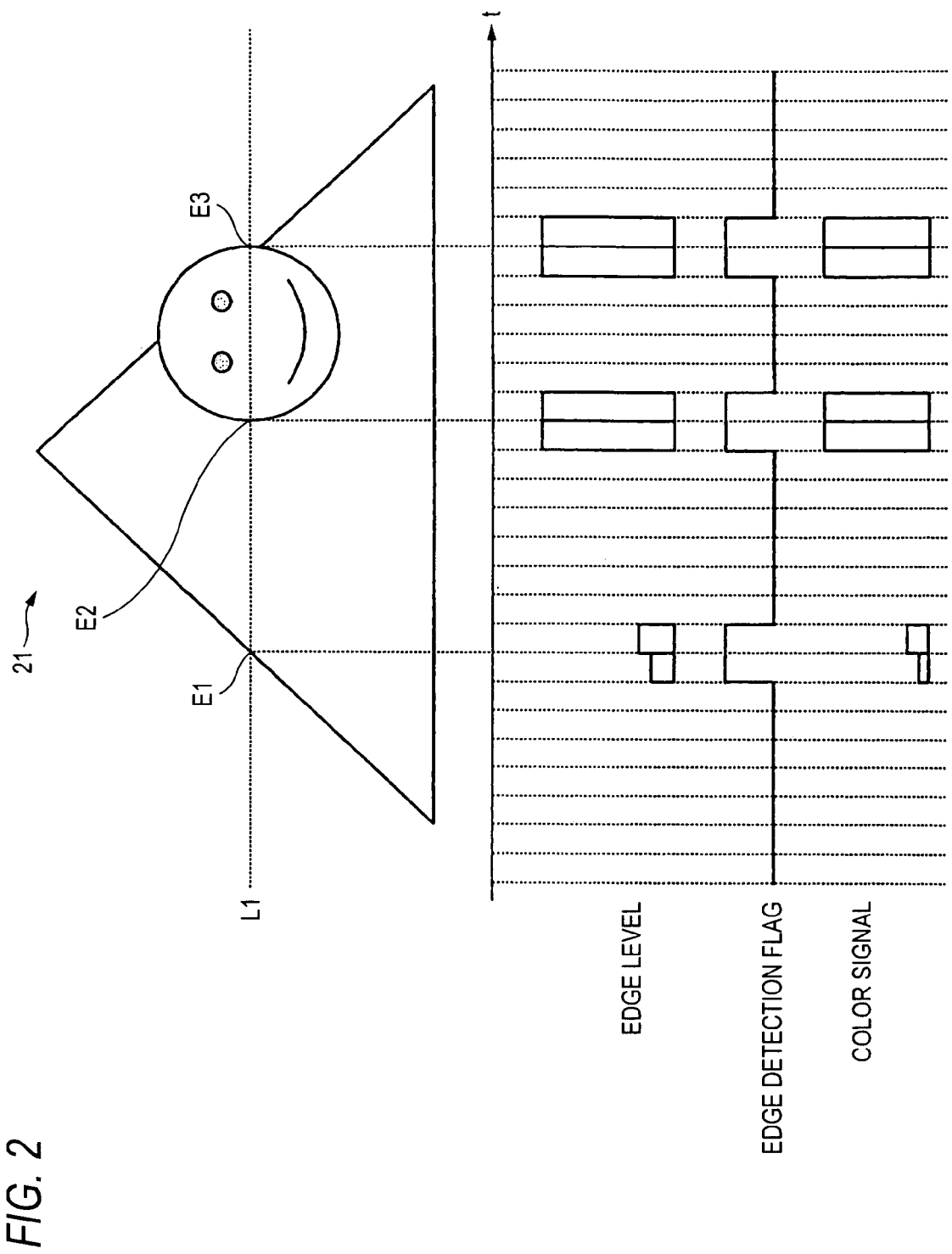
FIG. 2 is a timing chart of various signals of a display processing circuit in an edge emphasis mode.

FIG. 2 is a timing chart of various signals in the display processing circuit in the edge emphasis mode.

Specifically, FIG. 2 shows an edge level detected by the edge detector 52, an edge flag, and a color signal output from the color signal output unit 53 when edge detection is performed along a horizontal line L1 on an image 21 shown in the upper side of FIG. 2. The image 21 is based on an image signal input to the edge detector 52 and the replacement processor 54.

As shown in FIG. 2, the edge levels of pixels on the both sides of each of edges E1 to E3 on the horizontal line L1 are equal to or higher than a predetermined value, and thus the edge detection flags for the corresponding pixels are changed to the high level. According to the edge level, the level of the color signal of the color signal output unit 53 varies. In this case, basically, the higher the edge level is, the higher brightness becomes. The replacement processor 54 replaces the signal for the pixel in which the edge detection flag is at the high level, with the color signal for the corresponding pixel from the color signal output unit 53 and outputs the color signal.

Figure 3:
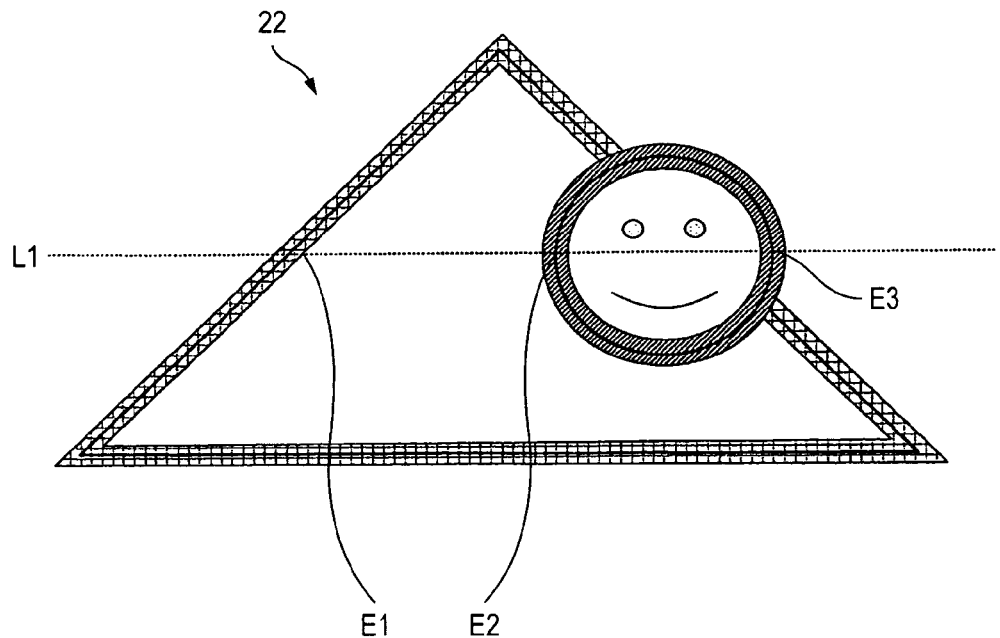
FIG. 3 is a view illustrating an example of an image displayed on a monitor in the edge emphasis mode.

FIG. 3 is a view showing an example of an image displayed on the monitor in the edge emphasis mode.

An image 22 shown in FIG. 3 is an image output from replacement processor 54 and is then displayed on the monitor 6 when the edge emphasis mode is selected and the image 21 shown in FIG. 2 is input to the replacement processor 54. As shown in FIG. 2, since the edge levels at the edges E2 and E3 are high, the color of the pixels on the both sides of each of edges E2 and E3 is converted into a color having high brightness. Further, as compared to the edges E2 and E3, since the edge level at an edge E1 is lower, the color of the pixels at both sides of the edge E1 is converted into a color having lower brightness.

Typically, as the focus lens 11 approaches the focused position, the detection value of the edge component becomes larger. For this reason, according to the above-mentioned image display method, when the edge level of an edge portion of a subject is equal to or higher than a predetermined value, the edge portion is displayed in a color not concerned with the original image of the subject. As a result, a user can easily view the edge portion. Further, as the degree of focusing on the subject increases, the edge portion is displayed in, for example, a brighter color so as to be emphasized. Therefore, it is possible for a user to simply and surely confirm which subject is brought into focus by viewing the monitor 6.

Even in a situation in which, due to the limitations of the brightness or resolution of the monitor 6, surrounding circumstances, and so on, it is difficult to view the resolution of the edge in a state in which a picked up image is normally displayed without any change, it is possible to simply confirm which subject is brought into focus and the degree of focusing. Therefore, it is possible to improve the operationality of a user in the manual focusing mode without increasing the manufacturing cost or size of the monitor 6.

In the examples shown in FIGS. 2 and 3, only the signal for the pixel whose edge level is equal to or higher than a predetermined value is replaced with a color signal for the corresponding pixel. However, the pulse width of the edge detection flag may be set to a width that corresponds to a plurality of pixels centered on the pixel whose edge level is equal to or higher than the predetermined value, which makes it possible to replace the signal for pixels in a certain range containing the pixel whose edge level is equal to or higher than the predetermined value with the color signal for the pixels in the certain range. The total width of pixels subjected to the replacement may be set such that the edge portion on the monitor 6 is easily viewed to the user.

Figure 4:
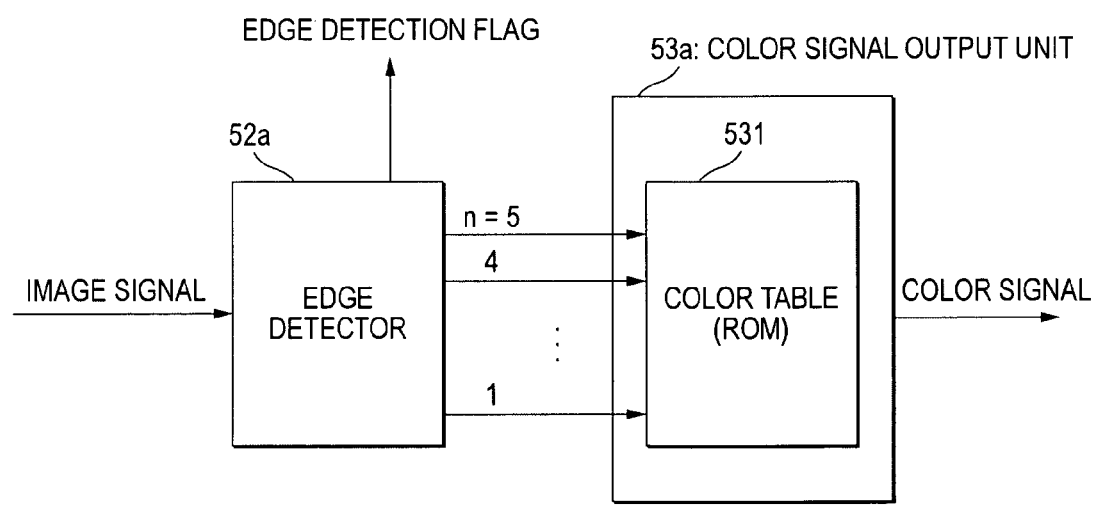
FIG. 4 is a view illustrating the configuration of an edge detector and a color signal output unit according to the first embodiment.

Next, a specific example of the configuration between the edge detector 52 and the color signal output unit 53 will be described. FIG. 4 is a view showing the configuration of the edge detector and the color signal output unit according to the first embodiment.

An edge detector 52a shown in FIG. 4 detects the edge level of each pixel by performing a high-pass filtering on the image signal output from the resolution changing unit 51. When the detected edge level is equal to or higher than a predetermined value, the edge detector 52a sets the edge detection flag to a high level. Further, the edge detector 52a calculates a variable n corresponding to the edge level and outputs the calculated variable n to a color signal output unit 53a. The color signal output unit 53a includes a color table 531 in a ROM in which a plurality of color signals used by the replacement processor 54 for replacement at edge portions is stored. The color signal output unit 53a reads, from the color table 531, one of the color signals corresponding to the variable n designated by the edge detector 52a, and outputs the read color signal to the replacement processor 54.

Figure 5:
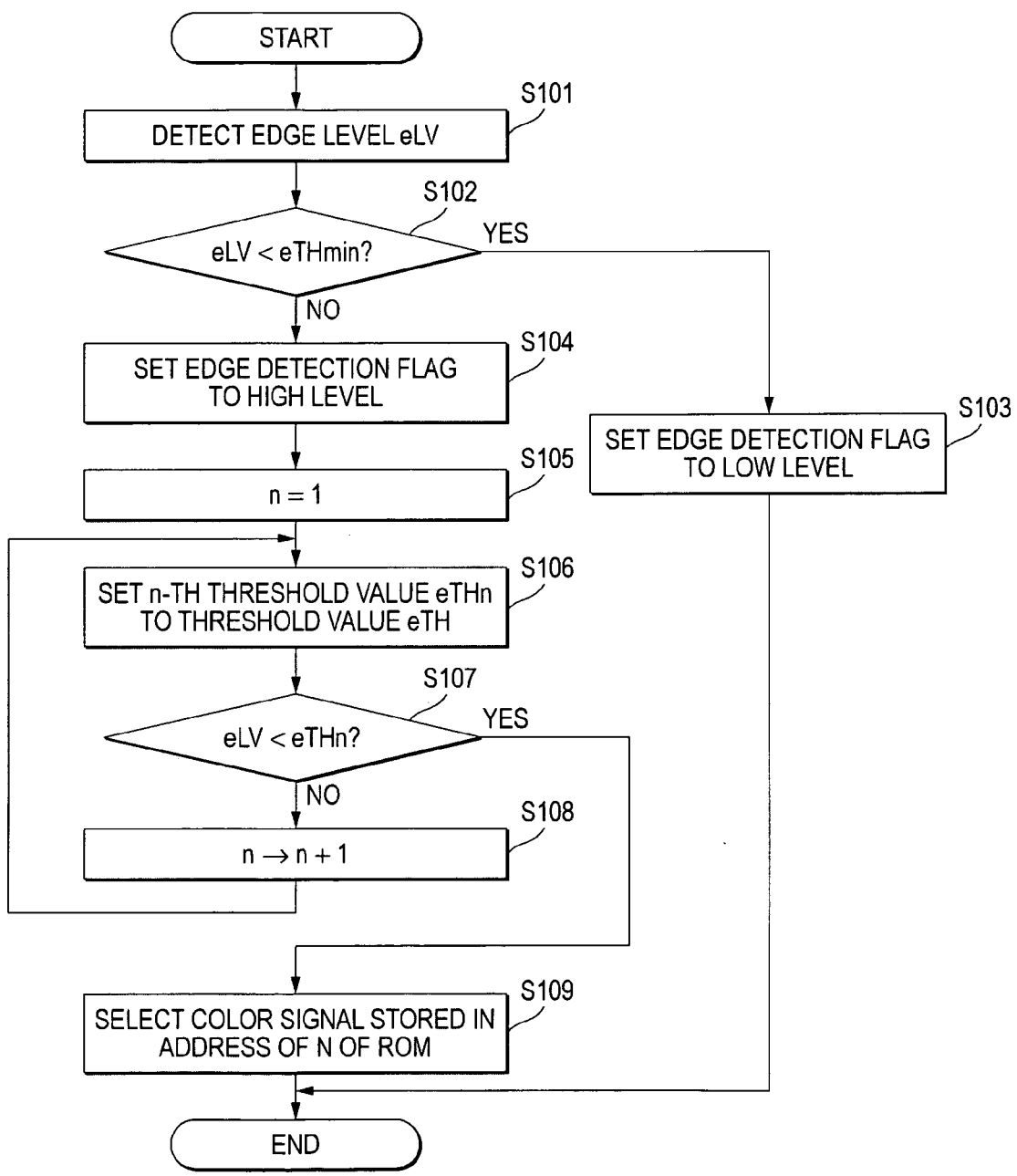
FIG. 5 is a flow chart illustrating the process of the edge detector according to the first embodiment.

FIG. 5 is a flow chart illustrating the flow of the processes of the edge detector according to the first embodiment.

[Step S101] The edge detector 52a detects an edge level eLV from an input image signal.

[Step S102] The edge detector 52a determines whether the detected edge level eLV is lower than a minimum threshold value eTHmin or not.

[Step S103] When it is determined in Step S102 that the edge level eLV is lower than the minimum threshold value eTHmin, the edge detector 52a sets the edged detection flag for the replacement processor 54 to a low level and then finishes the process in respect to the corresponding pixel.

Therefore, the replacement processor 54 outputs the signal for the pixel to be processed, without replacement.

[Step S104] When it is determined in Step S102 that the edge level eLV is equal to or higher than the minimum threshold value eTHmin, the edge detector 52a sets the edge level flag to a high level.

[Step S105] The edge detector 52a sets the variable n to '1'.

[Step S106] The edge detector 52a sets an n-th threshold value eTHn as a threshold value eTH.

[Step S107] The edge detector 52a determines whether the detected edge level eLV is lower than the threshold value eTH or not.

[Step S108] When it is determined in Step S107 that the edge level eLV is equal to or higher than the threshold value eTH, the edge detector 52a increases the variable n by '1'. Then, the edge detector 52a performs the process of Step S106.

[Step S109] When it is determined in Step S107 that the edge level eLV is lower than the threshold value eTH, the edge detector 52a designates an address n for the color table 531 (ROM) and selects the color signal stored in the address n. Then, the edge detector 52a reads the color signal from the designated address n of the color table 531 and outputs the read color signal to the replacement processor 54. The replacement processor 54 replaces the signal for the pixel to be processed with the color signal read from the color table 531.

In the above-mentioned process, only when the detected edge level eLV is equal to or higher than the threshold value eTH, the pixel to be processed is determined as an edge, and the replacement processor 54 performs the signal replacement. Further, the edge detector 52a reads a different color signal corresponding to the edge level eLV from the color table 531 and outputs the read color signal to the replacement processor 54. The color signals stored in the color table 531 are not concerned with the signal of the picked up image, and different colors are assigned according to the variable n. It is preferable that the edge portion is displayed in a striking color as the variable n increases such that the user can easily notice the edge level (that is, a focusing state) of the edge portion on the monitor 6. Besides, for example, a color signal having a higher brightness as the variable n increases is recorded in the color table 531, whereby the edge portion can be displayed in a brighter color emphatically as the edge level becomes higher.

In the first embodiment, the color signal output unit 53a may be configured to have only a function of reading the color signal from the designated address; however, a memory region corresponding to the variable n needs to be prepared as the color table 531.

Figure 6:
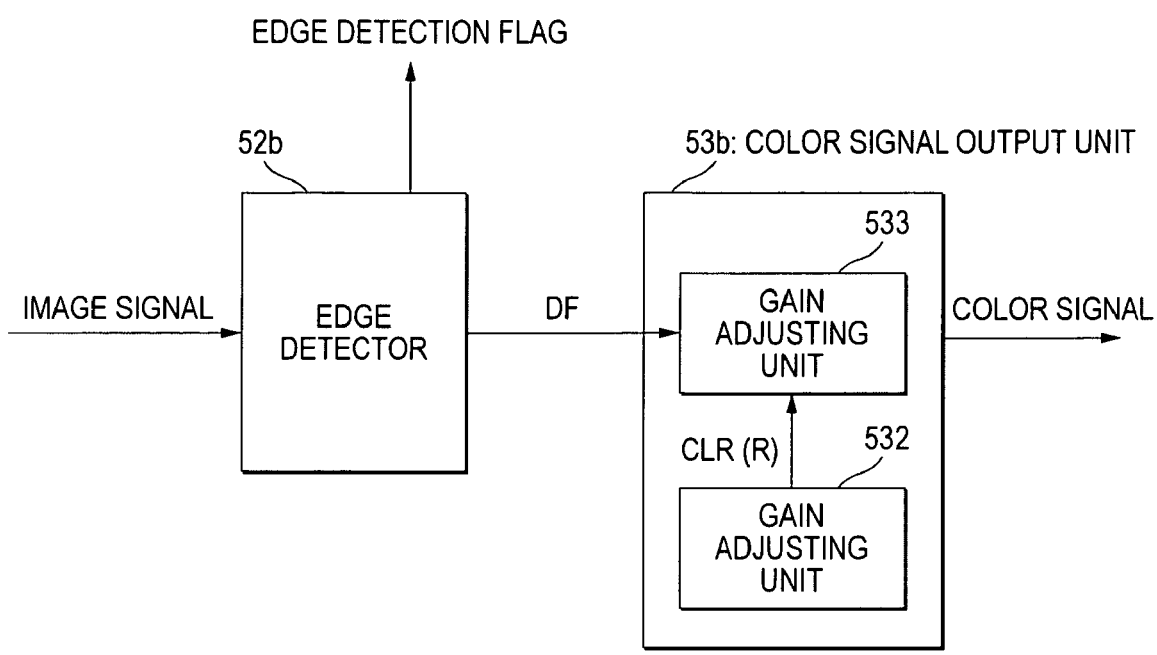
FIG. 6 is a view illustrating the configuration of an edge detector and a color signal output unit according to a second embodiment.

FIG. 6 is a view showing the configuration of an edge detector and a color signal output unit according to a second embodiment.

An edge detector 52b shown in FIG. 6 detects the edge level of each pixel by performing high-pass filtering on the image signal output from the resolution changing unit 51. When the detected edge level is equal to or higher than a predetermined value, the edge detector 52b determines the pixel to be processes as an edge and sets the edge detection flag to a high level. Further, when the edge detector 52b determines the pixel to be processed as an edge, it outputs a variable DF corresponding to the edge level to a color signal output unit 53b.

The color signal output unit 53b stores a reference color signal CLR as a reference of color signals used in the replacement processor 54 in a color storage unit 532 composed of a ROM in advance, amplifies the reference color signal CLR so as to have a gain corresponding to the variable DF from the edge detector 52b by the gain adjusting unit 533, and outputs the amplified color signal to the replacement processor 54. Here, a reference red color signal CLR(R) is stored in the color storage unit 532 as an example.

Figure 7:
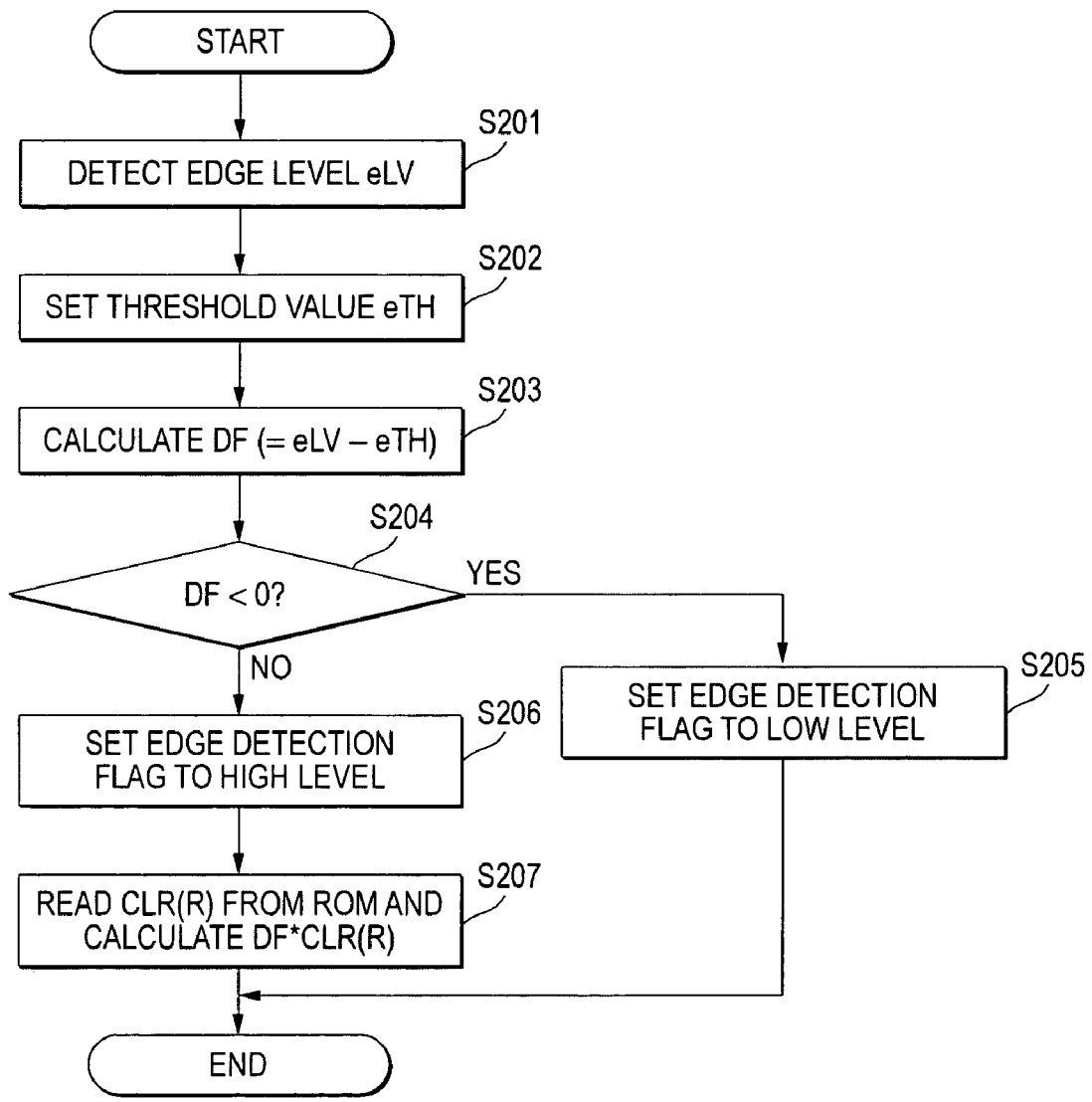
FIG. 7 is a flow chart illustrating the processes of the edge detector and the color signal output unit according to the second embodiment.

FIG. 7 is a flow chart illustrating the flow of the processes of the edge detector and the color signal output unit according to the second embodiment.

[Step S201] The edge detector 52b detects the edge level eLV from an input image signal.

[Step S202] The edge detector 52b sets the threshold value eTH to be compared with the edge level eLV.

[Step S203] The edge detector 52b calculates a differential value (variable DF) by subtracting the threshold value eTH from the edge level eLV.

[Step S204] The edge detector 52b determines whether the variable DF is smaller than '0' or not.

[Step S205] When it is determined in Step S204 that the variable DF is smaller than '0', the edge detector 52b sets the edged detection flag for the replacement processor 54 to a low level and then finishes the process in respect to the corresponding pixel. Therefore, the replacement processor 54 outputs the signal for the pixel to be processed, without replacement.

[Step S206] When it is determined in Step S204 that the variable DF is equal to or larger than '0', the edge detector 52b determines the pixel to be processed as an edge, sets the edge level flag to a high level, and outputs the variable DF to the gain adjusting unit 533 of the color signal output unit 53b.

[Step S207] The gain adjusting unit 533 reads the reference red color signal CLR(R) from the color storage unit 532, multiplies the value by the variable DF to adjust the gain of the reference red color signal CLR(R), and outputs the adjusted color signal to the replacement processor 54. In this way, the replacement processor 54 replaces the signal for a target pixel with the color signal from the gain adjusting unit 533.

In the above-mentioned process, only when the variable DF is equal to or larger than '0', the edge detector 52b determines the pixel to be processed as an edge, and thus the replacement processor 54 performs the signal replacement. Further, the color signal output unit 53b modulates a single color signal by the gain corresponding to the edge level eLV, and thus the replacement processor 54 performs a process such that, as the edge level eLV becomes higher, the edge portion is displayed in a more vivid (brighter) color.

In the second embodiment, as compared to the first embodiment, the edge detector 52b has a simpler structure, and the memory capacity of the color storage unit 532 decreases; however, an operational circuit is required as the gain adjusting unit 533.

Figure 8:
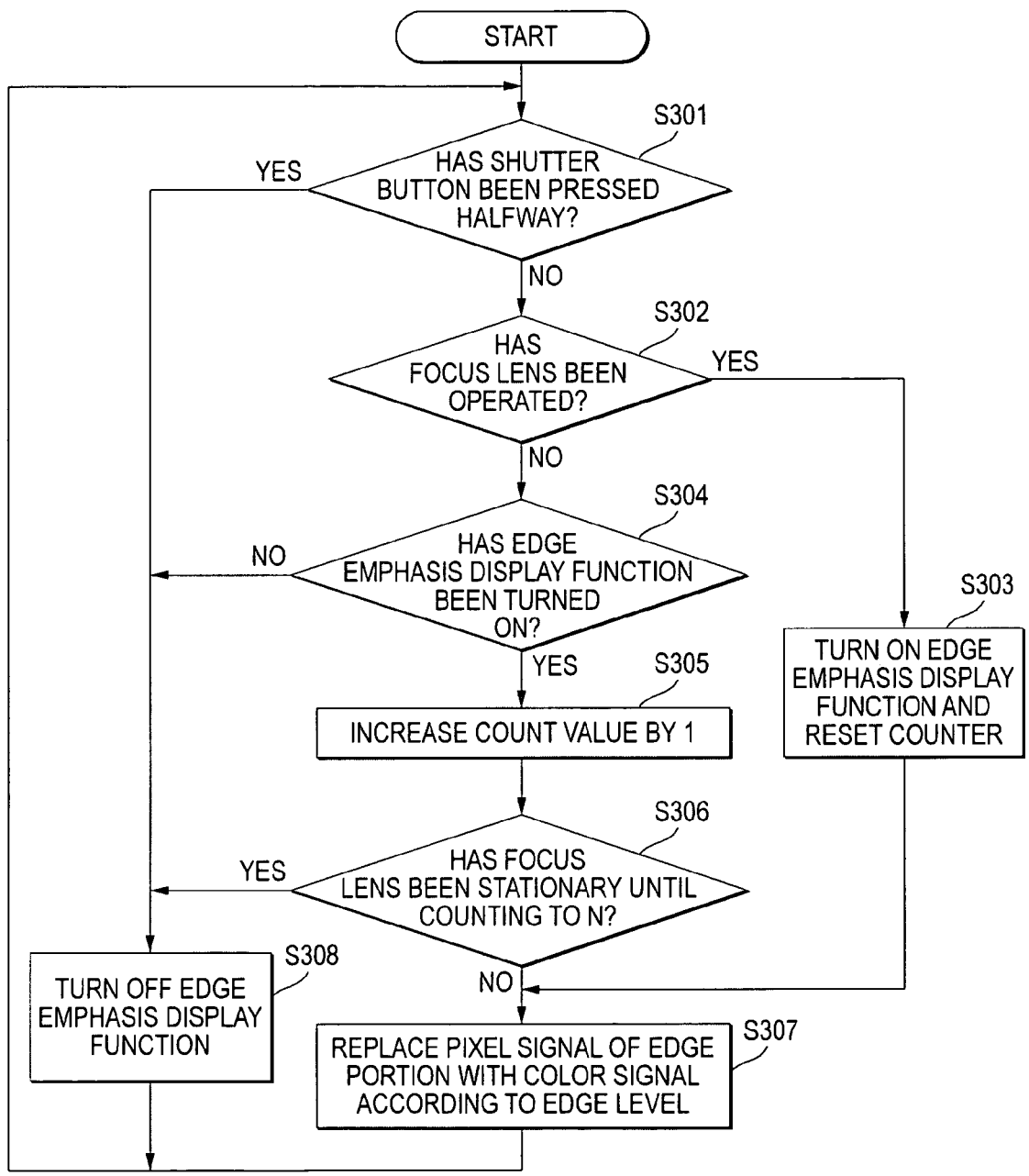
FIG. 8 is a flow chart illustrating the control process of a microcontroller in the edge emphasis mode.

Next, control in the edge emphasis mode will be described in detail. FIG. 8 is a flow chart illustrating the flow of the control process of the microcontroller in the edge emphasis mode. It is assumed that at the process start time of FIG. 8, the manual focusing mode and the edge emphasis mode are in an ON state.

[Step S301] The microcontroller 7 determines whether the shutter release button of the input unit 8 is in a halfway pressed state or not. If the shutter release button is in the halfway pressed state, the process proceeds to Step S308. However, if not, the process proceeds to Step S302. Further, when the shutter release button is pressed halfway, an image pickup operation control process and various image correcting processes substantially the same as that in which the picked up-image signal is recorded on the recording medium are performed. For example, AE control is performed again by the camera processing circuit 4 and the microcontroller 7. As a result, an image is displayed on the monitor 6 with the quality the same as or similar to while recording.

[Step S302] The microcontroller 7 determines whether the focus ring (or a focus button) of the input unit 8 has been operated and thus it is required to operate the focus lens 11. If it is required to operate the focus lens 11, the process proceeds to Step S303. However, if not, the process proceeds to Step S304.

[Step S303] The microcontroller 7 turns on the edge emphasis display function of the display processing circuit 5 (that is, turns on the edge detector 52, the color signal output unit 53, and the replacement processor 54). Further, the microcontroller 7 resets the count value of an internal counter to '0'. Then, the process proceeds to Step S307.

[Step S304] The microcontroller 7 determines whether the edge emphasis function of the display processing circuit 5 is in the ON state or not. If the edge emphasis function is in the ON state, the process proceeds to Step S305. However, if not, the process proceeds to Step S308.

[Step S305] The microcontroller 7 increases the count value of the internal counter by '1'. The increase of the count value is performed after a constant time from the previous increase of the count value or reset of the count value In this example, the count operation is performed whenever one frame (of the display image) is output.

[Step S306] The microcontroller 7 determines whether the count value is equal to or larger than N (N≧1) or not, that is, whether the focus lens 11 has been stationary until counting to N. If the count value is N, the process proceeds to Step S308. However, if not, the process proceeds to Step S307.

[Step S307] The microcontroller 7 operates the display processing circuit 5 to perform the edge emphasis display function. That is, under the control of the microcontroller 7, the edge detector 52 detects edges, the color signal output unit 53 outputs color signals corresponding to the edge levels, and the replacement processor 54 replaces the signal for each pixel in the edge portion with the color signal for the corresponding pixel. Then, the process returns to Step S301.

[Step S308] The microcontroller 7 turns off the edge emphasis display function of the display processing circuit 5 (that is, turns off the edge detector 52, the color signal output unit 53, and the replacement processor 54).

In the above-mentioned control example, even when the edge emphasis mode is turned on, the edge emphasis display function of the display processing circuit 5 does not necessarily need to be performed, and the operation is controlled according to the operational state of the focus lens 11. First, basically, when the manual focus operation is performed (Step S302), the edge emphasis display function starts (Step S303). During a period for which the focusing operation is continuously performed, the edge emphasis display function is in the ON state such that display for emphasizing the edges is continuously performed.

However, after the focusing operation, that is, after stopping the focus lens 11, if the focus lens 11 is not required to move for a constant time until the count value becomes N (Step S306), it is considered that the user intends to complete the focusing and confirm the focused state of the picked up image. Therefore, the edge emphasis display function is turned off (Step S308). Thus, it is possible to improve the operationality of a user and to reduce power consumption for an operation not performed in the displaying processing circuit 5.

Further, when the shutter release button is in the halfway pressed state (Step S301), in the manual focusing mode, it is considered that the focusing has been completed and the recording operation has started. Therefore, the edge emphasis display function is turned off (Step S308). Thus, it is possible to improve a recording response to the operation of the shutter.

In each of the above-mentioned embodiments, the edge components are detected from the image signal by the display processing circuit 5, but it may be detected by, for example, the camera processing circuit 4. If the image pickup apparatus has an auto-focus mode, the edge detection (high-frequency component detection) function for auto-focusing by the camera processing circuit 4 may be used for the edge emphasis display function in the manual focusing mode.

However, in a related art image pickup apparatus, typically, the number of pixels of the image pickup device 2 or the number of pixels of an image capable of being recorded on a recording medium is larger than the number of pixels of the monitor 6. For this reason, an image signal subjected to the edge detection of the camera processing circuit 4 has pixels larger than those of an image signal subjected to the edge detection of the display processing circuit 5. Therefore, frequency ranges that pass the image signals subjected to the edge detection of the camera processing circuit 4 and the display processing circuit 5 in the edge detection process are different from each other, which causes the configurations of filters and filter coefficients used to be different from each other.

Therefore, in order to use the edge detection result of the camera processing circuit 4 to control the edge detection or color signal output in the display processing circuit 5, a process of converting the edge detection result according to the number of pixels is required, resulting in an increase in the circuit size or the manufacturing cost. Meanwhile, when the display processing circuit 5 detects the edges from the image signal in which the number of pixels (resolution) has been down-converted, it is possible to simplify the configuration of an edge detection circuit and to further reduce the circuit size or the manufacturing cost. However, when the edge detection result of the camera processing circuit 4 is used, it is possible to improve the accuracy of edge detection or emphasis display. For example, it is possible to display the edge portion with high definition (clearly) in a region where the spatial frequency is high on the picked up image.

Further, in each of the above-mentioned embodiments, the color to which the color of the edge portion is changed to varies according to the edge detection level. However, it may be possible that, as the edge detection level becomes higher, the color of a wider region in the vicinity of the edge is changed to a single color. In this case, as the edge detection level becomes higher, the pulse width of the edge detection flag is controlled to become wider such that the signals for a plurality of pixels adjacent to the pixel, as well as the signal for the object pixel, are replaced with the same color signal. In this way, as the degree of focusing gets higher, the edge portion is displayed by a thicker line. Therefore, the user can easily confirm the subject brought into focus on the monitor 6.

The invention can be generally applied to various image pickup apparatuses using a solid image pickup device and other apparatuses, such as a cellular phone and a PDA (Personal Digital Assistants), having such an image pickup function and a manual focusing mode.

In each of the above-mentioned embodiments, the edge detector 52, the color signal output unit 53, and the replacement processor 54 are composed of dedicated hardware circuits. However, some of the processing functions or some of the edge detector 52, the color signal output unit 53, and the replacement processor 54 (for example, the function of the edge detector 52) may be performed by software in the microcontroller 7. Further, a program for performing the software may be installed in an image pickup apparatus from a portable storage medium, such as a flash memory, or through a network.

It should be understood by those skilled in the art that various modifications, combinations, sub-combinations and alterations may occur depending on design requirements and other factors insofar as they are within the scope of the appended claims or the equivalents thereof.

The invention claimed is:

1. An image pickup apparatus using a solid image pickup device, comprising:
   manual focus adjusting means for controlling a position of a focus lens in response to a user's input operation;
   edge detecting means for detecting edge components of each pixel from an image signal obtained by image pickup and for outputting detection levels of the detected edge components;
   color signal replacement means for replacing a signal of a pixel corresponding to the detection level or signals of pixels in a predetermined range containing the corresponding pixel on the image signal with a predetermined color signal when the detection level is equal to or higher than a predetermined value; and
   display means for displaying an image based on an output image signal from the color signal replacement means,
   wherein, when the detection level is equal to or higher than the predetermined value, the color signal replacement means selects a color signal corresponding to the detection level from a plurality of different color signals stored in advance and performs replacement using the selected color signal.

2. An image pickup apparatus using a solid image pickup device, comprising:
   manual focus adjusting means for controlling a position of a focus lens in response to a user's input operation;
   edge detecting means for detecting edge components of each pixel from an image signal obtained by image pickup and for outputting detection levels of the detected edge components;
   color signal replacement means for replacing a signal of a pixel corresponding to the detection level or signals of pixels in a predetermined range containing the corresponding pixel on the image signal with a predetermined color signal when the detection level is equal to or higher than a predetermined value;
   display means for displaying an image based on an output image signal from the color signal replacement means; and
   replacement operation control means for turning on a color signal replacement operation of the color signal replacement means when the focus lens starts to move by the manual focus adjusting means.

3. The image pickup apparatus according to claim 2,
   wherein, when a predetermined period elapses after the focus lens moves by the manual focus adjusting means and stops moving, the replacement operation control means turns off the color signal replacement operation of the color signal replacement means.

4. An image pickup apparatus using a solid image pickup device, comprising:
   manual focus adjusting means for controlling a position of a focus lens in response to a user's input operation;
   edge detecting means for detecting edge components of each pixel from an image signal obtained by image pickup and for outputting detection levels of the detected edge components;
   color signal replacement means for replacing a signal of a pixel corresponding to the detection level or signals of pixels in a predetermined range containing the corresponding pixel on the image signal with a predetermined color signal when the detection level is equal to or higher than a predetermined value;
   display means for displaying an image based on an output image signal from the color signal replacement means;
   a shutter release button receiving an input operation for recording the image signal obtained by image pickup on a recording medium in a completely pressed state and receiving an input operation for performing an image adjusting process and an image pickup operation control process that are substantially the same as that in which the image signal is recorded on the recording medium in a halfway pressed state; and
   replacement operation control means for turning off the color signal replacement operation of the color signal replacement means when the shutter release button is in the halfway pressed state.

5. An image pickup method for use with a solid image pickup device, said method comprising:
   controlling a position of a focus lens in response to a user's input operation;
   detecting edge components of each pixel from an image signal obtained by image pickup and outputting detection levels of the detected edge components;
   replacing a signal of a pixel corresponding to the detection level or signals of pixels in a predetermined range containing the corresponding pixel on the image signal with a predetermined color signal when the detection level is equal to or higher than a predetermined value; and
   displaying an image based on an output image signal obtained by the replacing of the signal of the pixel,
   wherein, when the detection level is equal to or higher than the predetermined value, a color signal corresponding to the detection level is selected from a plurality of different color signals stored in advance and the replacing is performed using the selected color signal.

6. An image pickup method for use with a solid image pickup device, said method comprising:
   controlling a position of a focus lens in response to a user's input operation;
   detecting edge components of each pixel from an image signal obtained by image pickup and outputting detection levels of the detected edge components;
   replacing a signal of a pixel corresponding to the detection level or signals of pixels in a predetermined range containing the corresponding pixel on the image signal with a predetermined color signal when the detection level is equal to or higher than a predetermined value;
   displaying an image based on an output image signal obtained by the replacing of the signal of the pixel; and
   turning on a color signal replacement operation when the focus lens starts to move.

7. The image pickup method according to claim 6,
   wherein, when a predetermined period elapses after the focus lens moves and stops moving, the color signal replacement operation is turned off.

8. An image pickup method for use with a solid image pickup device, said method comprising:
   controlling a position of a focus lens in response to a user's input operation;
   detecting edge components of each pixel from an image signal obtained by image pickup and outputting detection levels of the detected edge components;

replacing a signal of a pixel corresponding to the detection level or signals of pixels in a predetermined range containing the corresponding pixel on the image signal with a predetermined color signal when the detection level is equal to or higher than a predetermined value;

displaying an image based on an output image signal obtained by the replacing of the signal of the pixel;

receiving an input operation for recording the image signal obtained by image pickup on a recording medium in a completely pressed state of a shutter release button and receiving an input operation for performing an image adjusting process and an image pickup operation control process that are substantially the same as that in which the image signal is recorded on the recording medium in a halfway pressed state of the shutter release button; and turning off the color signal replacement operation when the shutter release button is in the halfway pressed state.

9. An image pickup apparatus using a solid image pickup device, comprising:

a controller to control a position of a focus lens in response to a user's input operation;

an edge detector circuit to detect edge components of each pixel from an image signal obtained by image pickup and to output detection levels of the detected edge components;

a color signal replacement circuit to replace a signal of a pixel corresponding to the detection level or signals of pixels in a predetermined range containing the corresponding pixel on the image signal with a predetermined color signal when the detection level is equal to or higher than a predetermined value; and a display to display an image based on an output image signal from the color signal replacement circuit, wherein, when the detection level is equal to or higher than the predetermined value, the color signal replacement circuit selects a color signal corresponding to the detection level from a plurality of different color signals stored in advance and performs replacement using the selected color signal.

10. An image pickup apparatus using a solid image pickup device, comprising:

a manual focus adjusting device to control a position of a focus lens in response to a user's input operation;

an edge detecting circuit to detect edge components of each pixel from an image signal obtained by image pickup and to output detection levels of the detected edge components;

a color signal replacement circuit to replace a signal of a pixel corresponding to the detection level or signals of pixels in a predetermined range containing the corresponding pixel on the image signal with a predetermined color signal when the detection level is equal to or higher than a predetermined value;

a display to display an image based on an output image signal from the color signal replacement circuit; and a replacement operation controller to turn on a color signal replacement operation of the color signal replacement circuit when the focus lens starts to move by the manual focus adjusting device.

11. The image pickup apparatus according to claim 10, wherein, when a predetermined period elapses after the focus lens moves by the manual focus adjusting device and stops moving, the replacement operation controller turns off the color signal replacement operation of the color signal replacement circuit.

12. An image pickup apparatus using a solid image pickup device, comprising:

a manual focus adjusting device to control a position of a focus lens in response to a user's input operation;

an edge detecting circuit to detect edge components of each pixel from an image signal obtained by image pickup and to output detection levels of the detected edge components;

a color signal replacement circuit to replace a signal of a pixel corresponding to the detection level or signals of pixels in a predetermined range containing the corresponding pixel on the image signal with a predetermined color signal when the detection level is equal to or higher than a predetermined value;

a display to display an image based on an output image signal from the color signal replacement circuit;

a shutter release button receiving an input operation for recording the image signal obtained by image pickup on a recording medium in a completely pressed state and receiving an input operation for performing an image adjusting process and an image pickup operation control process that are substantially the same as that in which the image signal is recorded on the recording medium in a halfway pressed state; and a replacement operation controller to turn off the color signal replacement operation of the color signal replacement circuit when the shutter release button is in the halfway pressed state.

* * * * *